US012128648B2

(12) United States Patent
Schauwecker et al.

(10) Patent No.: US 12,128,648 B2
(45) Date of Patent: Oct. 29, 2024

(54) FORMALDEHYDE-FREE HIGHLY WATER AND ABRASION RESISTANT OVERLAY FOR BUILDING PRODUCTS

(71) Applicant: ARCLIN USA LLC, Alpharetta, GA (US)

(72) Inventors: Christoph Schauwecker, Lowell, OR (US); Brandon Rice, Springfield, OR (US); Andy Dion, Boca Raton, FL (US); Teong Tan, Alpharetta, GA (US); Scot Johnson, Duluth, MN (US); Mark Anderson, Springfield, OR (US)

(73) Assignee: Arclin USA LLC, Alpharetta, GA (US)

( * ) Notice: Subject to any disclaimer, the term of this patent is extended or adjusted under 35 U.S.C. 154(b) by 748 days.

(21) Appl. No.: 16/976,321

(22) PCT Filed: Feb. 28, 2019

(86) PCT No.: PCT/US2019/020049
§ 371 (c)(1),
(2) Date: Aug. 27, 2020

(87) PCT Pub. No.: WO2019/169129
PCT Pub. Date: Sep. 6, 2019

(65) Prior Publication Data
US 2021/0001602 A1 Jan. 7, 2021

Related U.S. Application Data

(60) Provisional application No. 62/637,046, filed on Mar. 1, 2018.

(51) Int. Cl.
B32B 13/08 (2006.01)
B32B 7/12 (2006.01)
B32B 37/12 (2006.01)
B32B 38/08 (2006.01)
E04C 2/04 (2006.01)

(52) U.S. Cl.
CPC ............... B32B 13/08 (2013.01); B32B 7/12 (2013.01); B32B 37/12 (2013.01); B32B 38/08 (2013.01); E04C 2/043 (2013.01); B32B 2255/12 (2013.01); B32B 2255/26 (2013.01); B32B 2260/028 (2013.01); B32B 2260/046 (2013.01); B32B 2307/102 (2013.01); B32B 2307/718 (2013.01); B32B 2419/00 (2013.01)

(58) Field of Classification Search
None
See application file for complete search history.

(56) References Cited

U.S. PATENT DOCUMENTS

| 3,135,643 | A | 6/1964 | Michl |
| 3,445,327 | A | 5/1969 | Fuerst |
| 3,525,664 | A | 8/1970 | Hale et al. |
| 3,589,974 | A | 6/1971 | Albrinck et al. |
| 3,684,649 | A | 8/1972 | Shelton et al. |
| 3,798,117 | A | 3/1974 | Guertin et al. |
| 3,906,132 | A | 9/1975 | Uhl |
| 3,975,572 | A | * | 8/1976 | Power ............... D21H 19/62 428/452 |
| 4,713,299 | A | 12/1987 | Taylor et al. |
| 5,147,486 | A | 9/1992 | Hoffman |
| 5,306,783 | A | 4/1994 | Kirchgaessner et al. |
| 5,413,834 | A | 5/1995 | Hunter et al. |
| 5,798,179 | A | * | 8/1998 | Kronzer ............ B41M 5/0355 428/479.3 |
| 5,885,719 | A | 3/1999 | Perrin |
| 5,895,557 | A | * | 4/1999 | Kronzer ............ D21H 17/34 162/183 |
| 5,989,668 | A | 11/1999 | Nelson et al. |
| 6,113,725 | A | 9/2000 | Kronzer |
| 6,395,408 | B1 | 5/2002 | Nelson et al. |
| 8,043,661 | B2 | 10/2011 | Linnemann et al. |
| 8,808,850 | B2 | 8/2014 | Dion et al. |
| 2005/0079780 | A1 | 4/2005 | Rowe et al. |
| 2005/0176321 | A1 | 8/2005 | Crette et al. |
| 2005/0255331 | A1 | 11/2005 | Krebs et al. |
| 2008/0199666 | A1 | 8/2008 | Price |
| 2012/0076983 | A1 | 3/2012 | Yu et al. |

(Continued)

FOREIGN PATENT DOCUMENTS

| CA | 990632 A | 6/1976 |
| CL | 45465 | 6/2009 |
| EP | 0561086 A1 | 9/1993 |

(Continued)

OTHER PUBLICATIONS

Examination Report for corresponding Chilean application No. 202002228; dated Sep. 14, 2021 (28 pages) Machine Translation.
International Search Report and Written Opinion for corresponding International application No. PCT/US2019/020049; dated Apr. 30, 2019 (10 pages).
Sun, Xiuzhi, et al. "Shear Strength and Water Resistance of Modified Soy Protein Adhesives." Journal of the American Oil Chemists' Society 76.8 (1999): 977-980.
Poth, Ulrich et al. "Acrylic Resins—Chapter 3.5: Types, Properties and application of acrylic resins", Vincentz Network (2011): pp. 62-72.

(Continued)

Primary Examiner — Sheeba Ahmed
(74) Attorney, Agent, or Firm — Ram W. Sabnis

(57) ABSTRACT

A paper based overlay is provided. The overlay has a paper impregnated with a resin composition having an acrylic resin having a glass transition temperature in a range of from about −20° C. to about 40° C. and a resin content from about 15 to about 35 wt. % based on the weight of the overlay. The acrylic composition may include wax in the amount of about 0.005 to about 3.5 wt. % based on the weight of the resin composition. A method of producing the overlay is also provided. The overlay is highly water and abrasion resistant with low volatile content.

16 Claims, No Drawings

(56) References Cited

U.S. PATENT DOCUMENTS

2015/0064488 A1     3/2015    Foster et al.
2018/0030729 A1     2/2018    Aldabaibeh et al.

FOREIGN PATENT DOCUMENTS

| | | |
|---|---|---|
| EP | 3204551 A1 | 8/2017 |
| JP | H08-48005 A | 2/1996 |
| JP | 4492079 B2 | 6/2010 |
| JP | 2012-1610 A | 1/2012 |
| RU | 2381107 C2 | 2/2010 |
| WO | WO2010122078 A1 | 10/2010 |

OTHER PUBLICATIONS

International Living Future Institute, "The Red List—Version 3.1" (Sep. 15, 2017): 21 pages.

Official Action for corresponding Russian application No. 2020132116; dated May 16, 2022 (10 pages).

Extended European Search Report for corresponding European application No. 19760516.5; dated Nov. 8, 2021 (9 pages).

Office Action for corresponding Chilean application No. 202002228; dated Nov. 29, 2021 (28 pages) Machine Translation.

Office Action for corresponding Canadian application No. 3,092,809; dated Jun. 9, 2023 (3 pages).

Preliminary Qualifications Examination Report for corresponding Ukrainian application No. a202006301; dated Apr. 6, 2023 (8 pages).

Non-Final Office Action for corresponding U.S. Appl. No. 18/181,108, filed Sep. 7, 2023 (8 pages).

Final Rejection for U.S. Appl. No. 18/181,108, filed Dec. 15, 2023 (9 pages).

\* cited by examiner

FORMALDEHYDE-FREE HIGHLY WATER AND ABRASION RESISTANT OVERLAY FOR BUILDING PRODUCTS

The present application is a national phase application of PCT/US2019/020049, filed Feb. 28, 2019 and claims priority to U.S. Provisional Patent Application No. 62/637,046, filed Mar. 1, 2018, the entire contents of which are fully incorporated herein by reference.

PROBLEM/BACKGROUND

Field of Invention

This invention generally relates to formaldehyde-free overlays for building materials. More particularly, this invention relates to formaldehyde-free, water and abrasion resistant overlays for building materials, which are impregnated with an acrylic resin.

Description of the Related Art

Panels used in construction of interior walls and ceilings of buildings, referred to hereinafter as interior panels, are known in the art. Typically, such panels are capable of supporting their own weight and retaining their shape without the assistance of reinforcing techniques. Among other properties, the panels can have desirable sound-absorbing characteristics and good thermal stability, be able to withstand high humidity and be resistant to abrasion. Particularly in situations where the panel is used in a ceiling suspension system, the panel can be thin and lightweight, and provide good light reflection and a decorative outer surface that is exposed to moisture or abrasion from the interior of the room.

Interior panels can be constructed of a variety of materials. For example, the panels can comprise a base layer or core made of a gypsum-based material, mineral fibers, fiberglass, cellulose fibers, perlite and composites or laminates thereof with a facing material attached to one or both sides of the base layer. The facing materials are often referred as overlays, which are typically attached at the base layer and are present on the surfaces of the interior panels. The overlays are at least on the surface of the interior panel facing the interior of the room where moisture and wear to the overlays are expected.

To impart water and wear resistance, the overlays commonly include a wear-resistant resinous composition. One type of suitable resin is formaldehyde-based resins. However, formaldehyde containing overlays are no longer accepted by customers due to health concerns over formaldehyde being released from such overlays. Further, these overlays are also brittle in nature, thus it is difficult to emboss or fold them around edges of the interior panel while still maintaining water resistance.

An alternative resinous composition containing a thermo melt polymer, for example poly(vinyl chloride) (PVC), have also be used to produce overlays. Recently, building materials made from thermo melt polymers are also falling out of favor because they are made from non-renewable crude oil. Moreover, PVC has come under additional scrutiny since dioxins are produced during combustion of PVC. This quality results in PVC materials not being recommended by green building codes such as those of the US Green Building Council (USGBC). PVC is also known to emanate odors when in service, such as from released plasticizers that are added to the PVC material to maintain the flexibility of the product. Some of these plasticizers are known to have health concerns associated with them, including an increased cancer risk.

A third resinous composition for the overlays contains acrylic resins. Overlays produced from impregnated paper with acrylic resins are promising alternatives. U.S. Pat. No. 3,684,649 (to Weyerhaeuser Company) discloses resin-impregnated tissue overlays for various wooden substances. The overlays are made from impregnating tissue paper having a low basis weight with an aqueous emulsion of thermosetting acrylic resin and a solubilized thermoplastic acrylic resin. The ratio of thermoplastic resin to thermosetting resin is in the range of from 1:1 to 4:1 by weight of solids. But this patent does not disclose the glass transition temperature (Tg) of the acrylic resins or the acrylic resin content in the overlays. No wax is used in the overlays either.

US 2008/0199666 (to DEPCO-PPG Ltd.) discloses a method for manufacturing an impregnated paper or non-woven material for use as a decorative laminate, comprises the steps of: (a) applying a monomer or oligomer to the paper or non-woven material, in a dry process, which monomer or oligomer forms a film and/or filler bound to the paper or material; (b) thereafter applying to the paper or material having the film and/or filler of monomer or oligomer a polymer resin compatible with and cross-linkable with the monomer or oligomer; and (c) treating the resin whereby it forms a cross-link bond with the monomer or oligomer in the paper or material. The polymer resin may be urea formaldehyde resin or acrylic resin. The patent application again does not disclose the glass transition temperature (Tg) of the acrylic resin or the acrylic resin content in the impregnated paper or material. Further, no wax is used in the impregnated paper or material.

U.S. Pat. No. 8,808,850 (to Arclin) discloses an overlay for a wood substrate. The overlay has a core layer comprising a substrate and a resin composition, a top layer on one side of the core layer comprising a fire retardant intumescent coating composition, and an optional bottom layer on the opposite side of the core layer from the top layer. The fire retardant intumescent coating composition comprises expandable graphite, an aromatic polyamine resin, morpholine, a catalyst, or ammonium polyphosphate. The core layer may be paper impregnated with the resin composition comprising a phenolic resin and an acrylic resin. This patent likewise does not disclose the glass transition temperature (Tg) of the acrylic resin or the acrylic resin content in the impregnated paper. No wax is used in the overlay. Based on the type and amounts of the coatings used in U.S. Pat. No. 8,808,850, it is believed that the paper used in the core layer has a basis weight of at least 300 $g/m^2$. Such a paper would be slow to saturate with a resin composition because of the high thickness of the paper. Moreover, the impregnated paper would be too rigid to be bent around a 90 degree corner without cracking in some applications because of the rigidity of the paper.

U.S. Pat. No. 4,713,299 (to Formica Corporation) discloses paper sheets impregnated with a resin composition at a content from about 15% to about 80%, by weight of the paper sheet. The resin composition comprises a blend of (1) from about 35% to about 98%, by weight, based on the total solids of the composition, of a melamine/formaldehyde resin having a ratio of formaldehyde to melamine from about 1.1:1 to about 3:1, and (2) from about 2% to about 65%, by weight, based on the total solids of the composition, of a mixture of a polyalkylene glycol and an alkylated methylolmelamine. In one embodiment, the resin composition is utilized to impregnate kraft paper and comprises a blend of a phenol/formaldehyde resin, a cross-linking acrylic resin and an optional melamine/formaldehyde resin. This patent also does not disclose the glass transition temperature (Tg) of the acrylic resin or the acrylic resin content in the impregnated paper sheets. No wax is used in the paper sheets.

US 2005/0176321 (to Mw Custom Papers) discloses an overlay for a laminar product. The overlay including a fibrous web (e.g., paper) impregnated with a radiation curable saturating resin, which may be a reactive silicone acrylate oligomer. Examples of the saturating resins include vinyl chloride resins, acrylics polyurethanes, acrylated polyurethanes, and polyurethane (meth)acrylate resins. The saturating resins is typically incorporated into the overlay in an amount of from 50% to 400% based on dry weight of paper. This patent application does not disclose the Tg of the acrylic resin or use of wax in the overlay.

The present invention provides overlays that are formaldehyde-free and highly water and abrasion resistant, yet still very flexible for folding around edges or embossing processes. The overlays of the present invention do not pose a health risk since no formaldehyde or dioxin is released from the overlays.

SUMMARY OF THE INVENTION

In an aspect, disclosed is an overlay comprising paper impregnated with a resin composition comprising:

an acrylic resin having a glass transition temperature in a range of from about −20° C. to about 40° C., wherein the acrylic resin content in the overlay is in a range of from about 15 wt. % to about 35 wt. % based on the weight of the overlay.

In the foregoing embodiment, the overlay may have a glass transition temperature in a range of from about 10° C. to about 35° C., or from about 20° C. to about 30° C.

In each of the foregoing embodiments, the resin composition may further comprise 0.0005 wt. % to 3.5 wt. % wax, or from about 0.045 wt. % to about 3.5 wt. % wax, or from about 0.045 wt. % to about 2.25 wt. % wax, or from about 0.225 wt. % to about 1.35 wt. % wax, or from about 0.315 wt. % to about 0.675 wt. % wax, based on the weight of the resin composition.

In each of the foregoing embodiments, the wax may have a melt point in a range of from about 15° C. to about 85° C., or a range of from about 35° C. to about 65° C., or a range of from about 45° C. to about 55° C.

In each of the foregoing embodiments, the wax may be selected from slack wax, paraffin wax, Montan wax, microcrystalline wax, and mixture thereof.

In each of the foregoing embodiments, the resin composition may be free of wax and the acrylic resin content in the overlay may be in a range of from about 25.0 wt. % to about 35.0 wt. %, based on the weight of the overlay, or the acrylic resin content in the overlay may be in a range of from about 27.5 wt. % to about 35.0 wt. %, based on the weight of the overlay.

In each of the foregoing embodiments, the resin composition may comprise wax and the acrylic resin content in the overlay may be in a range of from about 15.0 wt. % to about 32.5 wt. %, or in a range of from about 15.0 wt. % to about 25.0 wt. %, or in a range of from about 17.5 wt. % to about 22.5 wt. %, based on the weight of the overlay.

In each of the foregoing embodiments, the resin composition may further comprise a component selected from diols, release agents, antifoaming agents and wetting agents.

In each of the foregoing embodiments, the paper may be a kraft paper.

In each of the foregoing embodiments, the kraft paper may be unbleached kraft paper.

In each of the foregoing embodiments, the kraft paper may have a basis weight in a range of from about 70 to about 90 g/m², or a range of from about 76 to about 80 g/m².

In each of the foregoing embodiments, the kraft paper may have an ash content in a range of from about 5 to about 12 wt. % of the kraft paper, or from about 6 to about 10 wt. % of the kraft paper.

In each of the foregoing embodiments, the acrylic resin may be a thermoplastic acrylic resin.

In each of the foregoing embodiments, the overlay may further comprise an acrylic paint coating that comprises an acrylic resin.

In each of the foregoing embodiments, the acrylic paint coating may further comprise a component selected from wetting agents, antifoaming agents, leveling agents, dispersing agents, and in-can preservatives.

In each of the foregoing embodiments, the acrylic paint coating may have a weight in a range of from about 25 to about 45 g/m², or a range of from about 30 to about 40 g/m², or in a range of from about 32.5 to about 37.5 g/m².

In each of the foregoing embodiments, the overlay may have a volatile content in a range of up to and including 4%, or a range from about 2 to about 4%, or a range of from about 2.5 to about 3.5%, based on the weight of the overlay.

In each of the foregoing embodiments, the overlay may have a water ingress of less than 200 g/m² as measured using ASTM D-5795 and more than 500 cycles as measured using a Taber abraser in conjunction with a Calibrase CS-17 wheel.

In an aspect, is a method for producing an overlay, comprising steps of:

a. impregnating paper with an acrylic resin composition comprising an acrylic resin having a glass transition temperature in a range of from about −20° C. to about 40° C. to an acrylic resin content in a range of from about 15 wt. % to about 35 wt. % based on the weight of the impregnated paper; and b. curing the impregnated paper at ambient pressure and at a temperature in a range of from 100° C. to about 200° C.

In the foregoing embodiment, the glass transition temperature of the acrylic resin may be in a range of from about 10° C. to about 35° C., or from about 20° C. to about 30° C.

In each of the foregoing embodiments, the temperature of the curing step may be in a range of from 110° C. to about 200° C., or from about 149° C. to about 177° C., or from 154° C. to about 171° C.

In each of the foregoing embodiments, the resin composition may further comprise 0.0005 wt. % to 3.5 wt. % wax, or from about 0.045 wt. % to about 3.5 wt. % wax, or from about 0.045 wt. % to about 2.25 wt. % wax, or from about 0.225 wt. % to about 1.35 wt. % wax, or from about 0.315 wt. % to about 0.675 wt. % wax, based on the weight of the resin composition.

In each of the foregoing embodiments, the wax may be selected from slack wax, paraffin wax, Montan wax, microcrystalline wax, and mixture thereof.

In each of the foregoing embodiments, the resin composition may be free of wax and the acrylic resin content in the impregnated paper may be in a range of from about 25.0 wt. % to about 35.0 wt. %, or a range of from about 27.5 wt. % to about 35.0 wt. %, based on the weight of the impregnated paper.

In each of the foregoing embodiments, the resin composition may comprise wax and the acrylic resin content in the impregnated paper may be in a range of from about 15.0 wt. % to about 32.5 wt. %, or a range of from about 15.0 wt. % to about 25.0 wt. %, or a range of from about 17.5 wt. % to about 22.5 wt. %, based on the weight of the impregnated paper.

In each of the foregoing embodiments, the paper may be kraft paper.

In each of the foregoing embodiments, may further comprise steps of:

c. applying a coating of acrylic paint on the cured paper, wherein the acrylic paint comprising an acrylic resin; and d. curing the paper with the coating of acrylic paint.

In each of the foregoing embodiments, the coating of acrylic paint may comprise a component selected from wetting agents, antifoaming agents, leveling agents, dispersing agents, and in-can preservatives.

In each of the foregoing embodiments, the coating of acrylic paint may have a weight in a range of from about 25 to about 45 g/m².

In each of the foregoing embodiments, may further comprise a step of:

e. adhering the overlay on a substrate using an adhesive and a pressure less than about 206843 Pa, or the pressure may be in a range of from about 13789.5 Pa to about 137895 Pa, or the pressure may be in a range of from about 13789.5 Pa to about 103421 Pa.

In an aspect is a building product comprising the overlay as discussed above and a substrate of either a gypsum board or wall board.

In each of the foregoing embodiments, the building product may be a ceiling tile comprising gypsum board.

In each of the foregoing embodiments, the building product may have a Sound Transmission Class (STC) rating of about 30 to about 65 when tested in accordance with ASTM E90-04 and E413-04.

Additional features and advantages of the disclosure may be set forth in part in the description which follows, and/or may be learned by practice of the disclosure. The features and advantages of the disclosure may be further realized and attained by means of the elements and combinations particularly pointed out in the appended claims.

It is to be understood that both the foregoing general description and the following detailed description are exemplary and explanatory only and are not restrictive of the invention as claimed.

DESCRIPTION OF THE PREFERRED EMBODIMENTS

It must be noted that as used herein and in the appended claims, the singular forms "a", "an", and "the" include plural references unless the context clearly dictates otherwise. Furthermore, the terms "a" (or "an"), "one or more," and "at least one" can be used interchangeably herein. The terms "comprising," "including," "having," and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4. It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

In one aspect, the invention provides an overlay comprising paper impregnated with a resin composition having an acrylic resin with a glass transition temperature in a range of from about −20° C. to about 40° C., or about 10° C. to about 35° C. The acrylic resin content in the overlay is in a range of from about 15 wt. % to about 35 wt. % based on the weight of impregnated paper.

The paper in the overlay is preferably kraft paper. However, other types of paper formed from any natural or synthetic fiber may also be used in the overlay. In one embodiment, the paper is a composite of a low basis weight cellulose fiber of the type conventionally used in forming overlays in the decorative laminating field or conventional overlays. One of the most common fibers used in the paper is alpha cellulose or mixtures thereof with other cellulose fibers, e.g., a highly bleached fibrous cellulosic pulp and/or alpha pulp. The pulp may consist of hardwoods or softwoods or a mixture of hardwoods and softwoods. Higher alpha cellulose such as cotton may be added to enhance characteristics of the fibers such as post-formability. The cellulose fibers used in the paper are preferably bleached or unbleached kraft pulp. Examples of paper suitable for the overlay are described in Canadian Patent 990,632 and U.S. Pat. Nos. 3,135,643; 3,445,327; 3,525,664; 3,798,117; and 3,975,572 (hereby incorporated by reference herein).

In preferred embodiments, the paper is bleached or unbleached kraft paper, available from manufacturers such as WestRock, Expera, Kapstone and International Paper, as saturating-grade or converting natural or bleached kraft. The kraft paper may have a basis weight preferably in the range of from about 70 to about 90 gram per square meter (g/m$^2$), more preferably in the range of about 76 to about 80 g/m$^2$. Generally, lighter-weight kraft paper (e.g., 70-75 g/m$^2$) is used when the underlying solid substrate has a relatively-smooth surface. The solid substrates with less smooth surfaces generally require a heavier-weight kraft paper (e.g., 80-85 g/m$^2$) to more effectively resist the surface cracking and surface imperfections associated with such solid substrates.

In some preferred embodiments, the suitable kraft paper has some desired properties. The kraft paper may have an ash content of about 5 to about 12 wt. %, or from about 6 to about 10 wt. % of the kraft paper. The permeability of the kraft paper may be in the range of from about 1 to about 15 seconds/100 ml of air, more preferably from about 1 to about 5 seconds/100 ml of air. The kraft paper preferably has high strength, with a wet tensile strength in the range of from about 5 N to about 20N per 15 mm, preferably from about 5 N to about 15 N per 15 mm. The pH of the kraft paper is preferably in the range of from about 6 to about 7.2.

The resin composition comprises an acrylic resin. The term "acrylic resin" as used herein is intended to include polymers or copolymers of acrylate monomers having the structure:

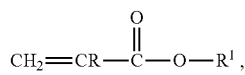

wherein R=H or a hydrocarbon based radical, and R$^1$=H or a hydrocarbon based radical. The hydrocarbon based radicals of R and R$^1$ include methyl, ethyl, propyl, isopropyl, and n-butyl, sec-butyl, isobutyl, tert-butyl, hexyl, heptyl, 2-heptyl, 2-ethylhexyl, 2-ethylbutyl, dodecyl, hexadecyl, 2-ethoxyethyl isobornyl and cyclohexyl. Preferred acrylates have R and R$^1$ with C1-C4. The preferred acrylic resins are the oligomers, polymers and copolymers, both linear and cross-linked, of methylmethacrylate and ethylmethacrylate. A preferred methylmethacrylate acrylic polymer is Elvacite® 2051, available from Imperial Chemical Industries (ICI).

In one preferred embodiment, the acrylic resin is a linear, branched or cross-linked homo-polymer. In another preferred embodiment, the acrylic resin is a graft copolymer, random copolymer, block copolymer or cross-linked copolymer with two or more acrylate monomers of the above formula or different monomers such as styrene and acrylonitrile (in ASA resins), or acrylamide and methacrylamide.

In some preferred embodiments, the acrylic resins may be prepared by polymerizing monomers such as acrylic acid, methacrylic acid, crotonic acid, benzoyl acrylic acid, fumaric acid, and maleic acid in the presence of another monomer that contains no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like.

In some other preferred embodiments, the acrylic resins may be prepared by copolymerizing a monomer containing a carboxyl group with other copolymerizable monomers such as styrene, including ortho-, meta-, or para-alkyl styrenes, o-, m-, or p-methyl, ethyl, metallic article propyl, and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as a chloro styrene, ortho-, meta-, or para-chloro styrenes, 2,4-dichloro styrene, 2,3-dichloro styrene, 2,5-dichloro styrene or the alkyl side chain styrenes such as a-methyl styrene, and a-ethyl styrene. Other polymerizable monomers may include vinyl monomers such as acrylamide, methacrylamide, ethacrylamide, N-tertiary-butylacrylamide, and the like.

Commercial acrylic resins are available from DuPont and others. Trademarked resins include Lucite®, Plexiglas®, Acronal®, PERSPEX™. For example, one commercial acrylic resin is an aqueous styrene-acrylate copolymer dispersion that can provide water resistance to impregnated paper. Further, another commercial acrylic resin is an aqueous styrene acrylic polymer that can provide water resistance and water blush resistance to the impregnated paper.

In some preferred embodiments, the acrylic resins are thermoplastic, optionally water-dispersible acrylic resins. The thermoplastic acrylic resins may include acid functional, epoxy functional, and hydroxy functional water dispersible acrylic resins. One preferred class of thermoplastic acrylic resins are carboxy functional acrylic resins having a glass transition temperature from about 10° C. to about 40° C. Numerous carboxy functional acrylic resins meeting those requirements are known and commercially available, including generally the carboxy functional acrylic resins sold by B. F. Goodrich under the trademark Carboset®, the carboxy functional acrylic resins sold by Goodyear under the trademark Pliolite® (7103/7104) and the Acrylamac® brand carboxy functional acrylic resins from McWhorter, Inc.

In some preferred embodiments, the acrylic resins have anionic charges. When the anionic acrylic resins are dispersed in water, the pH of the aqueous dispersion is advantageously adjusted to from about 6 to about 11 and, preferably to a pH from about 7 to about 9.

The glass transition temperature for the acrylic resin is preferably in the range of from about −20° C. to about 40° C., or from about 10 to about 40° C., or from about 15 to about 35° C., or from about 20 to about 30° C. Without wishing to be bound by any theory, it has been found that, if the glass transition temperature is too low, the impregnated paper may be not stiff enough and can be sticky in nature. The impregnated paper may also lose the ability to hold any embossed pattern. On the other hand, if the glass transition temperature is too high, the impregnated paper may be brittle and stiff, which makes the impregnated paper difficult to be embossed.

The acrylic resin in the resin composition is from about 15.0 to about 35 wt. %, or from about 15.0 to about 25 wt. %, or from about 17.5 to about 22.5 wt. %, by weight of the resin composition.

In some preferred embodiments, the resin composition is preferably an aqueous solution or aqueous suspension of the acrylic resin. In some other preferred embodiments, the resin composition may be based on an organic solvent. The organic solvent may be non-polar organic solvents (aliphatic and aromatic hydrocarbons chlorinated solvents, terpenes, etc.) or polar organic solvents (ketones, alcohols, esters, ethers, ether alcohols, and nitro paraffins, etc.).

In some preferred embodiments, the resin composition comprises wax at a concentration of from 0.0001 wt. % up to about 3.5 wt. % or from about 0.045 wt. % to about 3.5 wt. %, or from about 0.25 wt. % to about 3.5 wt. %, or from about 0.045 wt. % to about 2.25 wt. %, or from about 0.225 wt. % to about 1.35 wt. %, or from about 0.315 wt. % to about 0.675 wt. %, based on the solid wax weight and the weight of the resin composition. After impregnation, the wax content in the overlay is at from about 0.01 to about 0.5 wt. %, or from about 0.17 to about 0.37 wt. %, or from about 0.17 wt. % to about 0.28 wt. %, or from about 0.20 wt. % to about 0.25 wt. %, by weight of the overlay. Without wishing to be bound by any theory, it has been found that if the wax content (or wax loading) is too low, the overlay will not have sufficient water resistance. On the other hand, if the wax content is too high, the overlay becomes unsuitable for applying a coating on the impregnated paper.

The wax suitable to be used in the resin composition preferably has a melt point (Tm) in the range of from about 15° C. to about 85° C., or from about 35° C. to about 65° C., or from about 45 to about 55° C. By selecting a suitable wax with a suitable Tm, the best water repellent characteristic can be provided to the overlay. In some preferred embodiments, the wax has a pH in the range of from about 9.0 to about 11.0.

The wax is preferably an anionic wax or nonionic wax in an anionic emulsifying system, to be compatible with the acrylic resin in the resin composition. The wax is preferably a wax emulsion. Some exemplary wax that may be included in the resin composition is selected from slack wax, paraffin wax, Montan wax, micro crystalline wax, and mixture thereof. For example, a commercial nonionic wax is a petroleum wax which is stabilized by an anionic emulsifying system. A proper wax or wax based system is compatible with the acrylic resin. In other words, depending on the properties of the specific acrylic resin being used, one could select a proper wax or wax based system based on its compatibility with the acrylic resin.

An aspect of the present invention is the surprising discovery that when a small amount of wax is added to the resin composition, the acrylic resin content in the overlay may be dramatically reduced yet the overlay still has comparable levels of water and abrasion resistance in comparison with overlays having much higher acrylic resin content without the wax. Particularly, when wax is included in the resin composition for impregnation into the overlay, the acrylic resin content in the overlay is from about 15.0 wt. to about 32.5 wt. %, or from about 15.0 wt. % to about 25.0 wt. %, or from about 17.5 wt. % to about 22.5 wt. %, by weight of the overlay. On the other hand, when the resin composition does not include any wax, the acrylic resin content in the overlay is from about 25.0 wt. % to about 35.0 wt. %, or from about 27.5 wt. % to about 35.0 wt. % by weight of the overlay. These two types of overlays have comparable water and abrasion resistance, even though their acrylic resin content is significantly different. Without wishing to be bound by any theory, if the acrylic resin content in the overlay is too low, the overlay may not have sufficient water resistance. On the other hand, if the acrylic resin content in the overlay is too high, the overlay may be too stiff to be flexible in some applications when bending around a corner is required. In addition, using a too high acrylic resin content in the overlay adds insufficient benefit to justify the increase in cost.

In some preferred embodiments, the resin composition may further comprise a diol selected from $C_3$-$C_5$ diols, such as propylene glycol (propane-1,2-diol). The diol can reduce the difficulty in cleaning the resin composition off of the equipment used for impregnating the paper.

Other components that may preferably be included in the resin composition include release agents, antifoaming agents or wetting agents.

Suitable release agents include the Werner type chromium complexes such as those sold under the Tradename Quilon® by E. I. DuPont (e.g., Quilon S—the stearic acid complex, Quilon M—the myristic acid complex), fatty acid alcohols (e.g. 2-ethylhexanol, dodecyl alcohol), silicone oils, fatty acids (e.g. neodecanoic acid), and the like.

Suitable antifoaming agents include trialkyl phosphates such as tributyl phosphate, sulfonated tallow waxes, liquid fatty acid mineral oils, as well as various commercial materials sold for their antifoaming properties such as Hercules Defoamer 831, Nopco® KFS, Napco® 1497-V, General Electric Antifoam 60, and Dow Corning Antifoam A. In some preferred embodiments, the antifoaming agent is used in an amount ranging from a few parts per million to about 0.5 or about 1 wt. % based on the weight of the resin composition.

Suitable wetting agents include polyhydric alcohols such as ethylene glycol, propylene glycol, polypropylene glycol, polyethylene glycol, diethylene glycol monoethyl ether, 1,3-butylene glycol, glycerin, polyglycerin, and hygroscopic polymeric materials such as methyl cellulose, sodium carboxymethyl cellulose, xylitol, sorbitol, and maltitol. These wetting agents may be used singly or in any mixture thereof. The wetting agents may be used in a liquid state. The wetting agents are preferably present in an amount of from about 0.2 to about 1.0 wt. % by weight in the resin composition.

The paper is impregnated with the resin composition using a conventional treating technology to the desired resin content. In one aspect, the paper from a paper roll is immersed into the resin composition in a pan for a predetermined period of time. The paper may be advanced with a series of rolls. A pair of nip rolls are used to remove excess resin composition from the saturated paper to achieve the desired resin content.

In one preferred embodiment, the resin composition is maintained at a temperature in the range of from about 5° C. to about 40° C., or preferably from about 10° C. to about 35° C. when the paper is immersed in the resin composition.

The impregnated paper is then cured at a temperature in the range of from 120° C. to about 200° C., or from about 149° C. (300° F.) to about 177° C. (350° F.), or from about 154° C. (310° F.) to about 171° C. (340° F.). In one preferred embodiment, the curing is performed in an oven having five zones with temperature of about 152° C. (305° F.), about 154° C. (310° F.), about 154° C. (310° F.), about 171° C. (340° F.), and about 171° C. (340° F.), respectively, where the cured paper exits the oven at the last zone that has a temperature of about 171° C. (340° F.).

In some preferred embodiments, an acrylic paint may be applied to the impregnated and cured paper. The acrylic paint comprises an acrylic resin, which may be the same acrylic resin in the resin composition used for impregnating the paper, or an acrylic resin different from the acrylic resin in the resin composition. The acrylic resin in the acrylic paint preferably has a high degree of flexibility, is free of one or more of the components listed on the living building challenge red-list volume 3.1 (e.g., formaldehyde, the red-list of the International Living Future Institute available on 2017-Sep.-15) which is herein incorporated in its entirety by reference, and provides good water hold out, compatibility and inter coating adhesion with the impregnated paper.

In addition, other components may preferably be included in the acrylic paint, such as wetting agents, antifoaming agents, leveling agents, dispersing agents, and in-can preservatives. The wetting agents and antifoaming agents have been described above.

The leveling agents can prevent defects or irregularities on the surface of wet acrylic paint coating when drying so as to result in a smooth dry paint film on the impregnated paper. Suitable leveling agents should have a lower surface tension than that of the acrylic resin and be compatible with the acrylic resin in the paint. Leveling agents are commercially available by various manufacturers.

Suitable dispersing agents include lignin sulphonate, a carboxyl-containing polymer such as polyacrylate and carboxyl-containing polyurethanes, a styrene acrylic polymer, an acrylic co-polymer, polyurethane, an alkylpolysaccharide, salts of aliphatic rosin and naphthenic acid, condensation products of formaldehyde of low molecular weight and naphthene sulfonic acid, higher alkyl sulfate such as sodium lauryl sulfate, alkyl aryl sulfonate such as dodecylbenzene sulfonate, sodium salt or potassium salt of isopropyl benzenesulfonic acid or isopropyl naphthalenesulfonic acid, sulfosuccinates such as sodium dioctyl sulfosuccinate, alkaline metal salt of higher alkyl sulfosuccinic acid such as sodium octyl sulfosuccinate, sodium N-methyl-N-palmitoyltaurate, sodium oleylisethionate (SIC), alkaline metal salts of alkyl aryl polyethoxyethanol sulfuric acid or sulfonic acid such as sodium t-octylphenoxy polyethoxyethanol sulfate having 1-5 oxyethylene units, and ethoxylated tristyrenephenol phosphate, for example poly ethoxylated phosphoric acid. Typical dispersing agents are 1-(2-aminoethyl) piperazine, 2-amino-6-methoxybenzothiazole, 4-(2-aminoethyl)pyridine, 4-(aminomethyl)pyridine, 3-amino-1,2,4-triazole, 1-(3-aminopropyl)imidazole, 4-(2-hydroxyethyl)pyridine and 1-(2-hydroxyethyl)imidazole.

The acrylic paint, when purchased commercially, typically includes an in-can preservative. Suitable in-can preservatives include benzophenone-4, disodium EDTA, methylparaben, butylparaben, ethylparaben, isobutylparaben, propylparaben, iodopropynyl butylcarbamate, phenoxyethanol, and diazolidinyl UREA.

In some preferred embodiments, the acrylic paint may include one or more colorants thus imparting desired color to the overlay, such as red, yellow, blue, green, purple, orange, pink, light green, white and light blue. It is within the scope of the present invention that with the addition of the appropriate colorants, the acrylic paint can be produced in any color of the visible color spectrum. Suitable colorants include all of the FD&C colors approved for cosmetic use, as well as various organic and inorganic pigments, vegetable dyes and other naturally occurring earth pigments. Common pigments include indigo, ocher, umber, carbon black, iron oxide, D & C Yellow No. 5, Clarion Red, Barium Lithol, D & C Blue No. 1, D & C Red No. 27, Victoria Blue Lake, Prussian Blue, Lithol Rubine, D & C Yellow No. 6, FD & C Blye No. 2, Acid Violet 4 BNS, Calcium Lithol and Titanium Dioxide.

In one preferred embodiment, the acrylic paint comprises a styrene acrylic polymer, $TiO_2$, wax and calcium carbonate, which has a white color.

After the acrylic paint is applied on the impregnated paper, the paper is cured again. In a preferred embodiment, this curing step is performed using the same conditions as the curing step for the immersed, impregnated paper, before applying the acrylic paint.

After this curing step, a coating of acrylic paint is formed on the impregnated paper. The coating of acrylic paint is flexible to withstand cracking and can also provide water resistance. In addition, the coating of acrylic paint can resist abrasion and impart the correct color onto the overlay (with colorants in the acrylic paint). The coating preferably has a weight of from about 25 to about 45 $g/m^2$, or from about 30.0 to about 40.0 $g/m^2$, or from about 32.5 to about 37.5 $g/m^2$.

In some preferred embodiments, the overlay may have a fire retardant coating. Suitable fire retardant coating typically contains three components that are the basic elements to form a char: donors of acid, gas, and carbon. Commercially available fire retardant coating usually included ammonium polyphosphate (acid donor), pentaerythritol (carbon donor), and melamine (blowing agent). The fire retardant coating will form a char layer at the surface of the overlay during combustion to protect the material. Some suitable fire retardant coatings are described in U.S. Pat. No. 8,808,850, which is incorporated by reference herein.

In some preferred embodiments, the overlay is absent of graphite. In some other embodiments, the fire retardant formulation is absent of graphite. Instead, the retardant formulation includes ammonium polyphosphate (acid donor), pentaerythritol (carbon donor), and melamine (blowing agent).

The overlay preferably has a low level of residue volatiles. The volatile content of the overlay is in the range of from 0.0001% up to and including 4%, or from about 2 to about 4%, or from about 2.5 to about 3.5%. The volatile content in % is calculated as follows: (m1−m2)/m1 [%], in which m1=weight of the impregnated paper (before drying in a thermostat), m2=weight of the impregnated paper after drying in a thermostat at 160° C. for 5 min.

The overlay of the present invention is free of formaldehyde. The overlay does not release gas dioxins when burned. In addition, the overlay is free of plasticizers while still providing high water resistance and flexibility. Thus, it does not release plasticizers into the environment.

The overlay is highly water resistant and abrasion resistant. Water resistance of the overlays is assessed using the ASTM D-5795 ("Cobb ring test") to measure water ingress. An overlay having a water ingress of less than 200 $g/m^2$ after two hours is considered highly water resistant, and passes the test. Abrasion resistance is evaluated by a Taber abrasion test using a Taber Abraser in conjunction with a Calibrase CS-17 wheel. If 500 or more cycles is reached with still at least 25% of the coating still remains on the impregnated paper, the overlay is considered sufficiently abrasion resistant and passes the test. In some embodiments, at least about 30% of the coating still remains on the impregnated paper after 500 cycles.

The overlay of the present invention may be tested for embossing. An embossing test is performed by running an overlay sample through a craft store embosser (e.g., a Cricut 2000293 Cuttlebug Machine) using a little bubble embossing folder. Once the sample has been embossed, it is examined under a microscope at 10× magnification to determine if the overlay has cracked. If the overlay sample can endure the embossing test with no significant cracks, the overlay passes the test.

The water resistance of the overlay may also be tested with a water drop test, which is done by placing a drop of water on the surface of the overlay using a pipette. A watch glass is placed over the water drop and a stop watch is used to determine how long it takes for the water to be absorbed into the overlay. If it takes more than 15 minutes for the drop of water to be absorbed, then the overlay passes the water drop test.

Another advantage of the overlay is that it is sufficiently flexible to allow embossment of the overlay without causing cracks. The embossment impacts 3-D indented patterns on the overlay surface. In some embodiments, the embossment is performed with a fixed press plate or a press drum.

The 3-D patterns of the embossment may be decorative patterns selected from bow-tie pattern, snowflake pattern, shapes such as circles, ovals, diamonds, triangles, hexagons, various quadrilaterals, stars, waves, fish scales, flowers, grass and plants, or combinations thereof.

In one preferred embodiment, the overlay is sufficiently flexible to be folded around a 90 degree corner without cracking.

The overlay may be applied to a substrate, such as a gypsum board to produce a building product to be used as a ceiling tile, in sound dampening wall board applications, in clean room facilities or in food processing facilities. The application of the overlay to a substrate does not require a high temperature or high pressure presses. A low pressure press and a contact adhesive such as a PVA glue is preferred. In one preferred embodiment, the PVA glue is H.B. Fuller PACE® 383 (a stabilized polyvinyl alcohol and vinyl acetate adhesive). The glue is applied to the substrate to a glue coating of 15-30 g/m². The overlay is then placed on the top of the glue coating without heating either the overlay or the glue on the substrate.

The overlay is pressed against the substrate using a low pressure press by passing under a roll with a set gap, providing a low pressure to the overlay to form an assembly. The resulting assembly (such as ceiling tiles or dray wall boards) is stacked and the glue is allowed to cure. The pressure for the press is less than about 206843 Pa (30 psi), or from about 13789.5 Pa (2 psi) to about 137895 Pa (20 psi), or from about 13789.5 Pa (2 psi) to about 103421 Pa (15 psi), or from about 13789.5 Pa (2 psi) to about 68947.6 Pa (10 psi), when the overlay is embossed. When the overlay is not embossed, the pressure may go higher up to about 689476 Pa (100 psi).

When the building product is used in a structure where the building product remains visible, the overlay comprises the acrylic paint to provide a uniform color and/or embossed patterns. These applications include ceiling tiles and other paneling applications. When the building product is hidden in a structure such as sound dampening wall board where the product is used as part of an assembly and hidden when the assembly is complete, the overlay does not need the acrylic paint or embossment.

A property of the building product comprising the acrylic resin impregnated overlay and a substrate of either a gypsum board or wall board with sound dampening materials applied between the board and the overlay is to impart a sound dampening property to the final building product. The building product preferably has a Sound Transmission Class (STC) rating of about 30 to about 65 when tested in accordance with ASTM E90-04 and E413-04. The STC is a single-number rating of a material's or an assembly's ability to resist airborne sound transfer at frequencies of 125-4000 Hz. In general, a higher STC rating blocks more noise from transmitting through a partition.

In certain embodiments, the overlay has less than 0.05 wt. % or less than 0.001 wt. % of each of thermosetting acrylic resin, a resin containing formaldehyde, silicone acrylate oligomer, vinyl chloride resins, acrylics polyurethanes, acrylated polyurethanes, and polyurethane (meth)acrylate resins. In certain embodiments, the overlay has a single paper layer with no other paper layers. In certain embodiments, the overlay does not contain any plasticizer or petroleum products. In one embodiment, the overlay does not release dioxin in the event of combustion or in the course of use.

The following examples are illustrative, but not limiting, of the processes and compositions of the present disclosure. Other suitable modifications and adaptations of the variety of conditions and parameters normally encountered in the field, and which are obvious to those skilled in the art, are within the scope of the disclosure.

EXAMPLES

Example 1

Kraft paper having a weight of 80 g/m² was treated with an aqueous solution of acrylic resin (with a Tg being 23° C.). The aqueous solution did not include wax. The paper was impregnated to a resin content of 35 wt. %. After curing of the impregnated paper at a temperature between 120 to 150° C. for 15 to 50 seconds, it was top coated with an acrylic paint comprising a polystyrene acrylic resin, $TiO_2$, wax, and calcium carbonate. The acrylic paint was applied to the impregnated paper to a coat weight of 30 g/m². The impregnated paper with the paint coat was cured again at a temperature between 120 to 150° C. for 15 to 50 seconds and embossed to produce the final overlay product. The overlay was tested to demonstrate its flexibility. The overlay was then affixed to a gypsum wall board as the substrate using a polyvinyl acetate (PVA) glue.

The assembly of overlay and gypsum wall board was tested for its water resistance using the Cobb ring test with the average of three measurements reported in Table 1 below. All the samples passed the test.

TABLE 1

| Sample | Water Resistance of Overlay | | | | |
| --- | --- | --- | --- | --- | --- |
| | Average Water Gain (g/m²) | | | | |
| Time | 2 hour | 4 hour | 6 hour | 8 hour | 24 hour |
| Example 1 | 100 | 156 | 215 | 234 | 255 |

Example 2

In a similar process to that of Example 1, the overlay was produced from 80 g/m² kraft paper with a resin content of 35 wt. % (the acrylic resin has a Tg of 23° C.) and a paint coat weight of 40 g/m². In addition the final overlay was embossed. This overlay did not contain wax either. The overlay was affixed to gypsum wall boards using PVA glue. The assembly of overlay and gypsum wall board was tested for its water resistance by the Cobb ring test and its abrasion resistance by the Taber abrasion test. The test results demonstrated that the overlay passed both the Cobb ring test and Taber abrasion test requirements.

The Cobb ring test was performed on the produced overlay on three different samples of the produced overlay. The results are present in Table 2 as an average of the three measurements of the three samples.

TABLE 2

| | Cobb Test Results | | | | |
| --- | --- | --- | --- | --- | --- |
| | Average Water Gain (g/m²) | | | | |
| Time | 2 hour | 4 hour | 6 hour | 8 hour | 24 hour |
| Water ingress (g/m²) | 55.5 | 71.5 | 78.3 | 73.37 | 106.05 |

After the Taber abrasion test was done for 500 cycles, at least some paint coating still remained on the surface of the overlay, indicating acceptable abrasion resistance.

Example 3

Two samples of Kraft paper with weight of 80 g/m² were used in this example. One sample was treated with an aqueous solution of acrylic resin (with a Tg being 23° C.) without wax and the other sample was treated with an aqueous solution of acrylic resin with wax. The samples were treated to a resin content of 30 wt. % in the overlay (without wax in the aqueous solution) and a resin content of 20 wt. % and wax content of 1.24 wt. % in the overlay (with wax emulsion in the aqueous solution). The overlays were not applied with an acrylic paint and they were affixed to drywalls using a PVA glue. The assemblies were tested and passed the Cobb ring test.

Comparative Example A

A PVA resin 1 was used to treat kraft paper. The PVA resin 1 has a Tg of 38° C. The paper was treated to a resin content of 25.5 wt. % and volatile content of 1.3 wt. %. The impregnated paper was tested using the embossing test and water drop test as described herein. The impregnated paper showed severe cracking in the embossing test. This overlay failed the embossing test. The water drop test showed that it took less than 2 minutes for the drop of water to be absorbed, indicating minimal water resistance. This overlay failed the water drop test.

Comparative Example B

A PVA resin 2 was used to treat kraft paper. The PVA resin 2 has a Tg of –12° C. The paper was treated to a resin content of 26.1 wt. % and volatile content of 1.3 wt. %. The impregnated paper was tested using the embossing test and water drop test as described herein. The impregnated paper showed no cracking with the embossing test. This overlay passed the embossing test. However, the water drop test showed less than 2 minutes for the drop of water to be absorbed, indicating minimal water resistance. This overlay failed the water drop test.

Example 4

An acrylic resin A was used to treat kraft paper. The acrylic resin A has a Tg of –6° C. The paper was treated to a resin content of 24.2 wt. % and volatile content of 2.1 wt. %. The impregnated paper was tested using the embossing test and water drop test as described herein. The impregnated paper showed no cracking with the embossing test. This overlay passed the embossing test. The water drop test showed that it took more than 15 minutes for the drop of water to be absorbed, demonstrating acceptable water resistance. This overlay also passed the water drop test.

Example 5

An acrylic resin B was used to treat kraft paper. The acrylic resin B has a Tg of –5° C. The paper was treated to a resin content of 27.1 wt. % and volatile content of 0.9 wt. %. The impregnated paper was tested using the embossing test and water drop test as described herein. The impregnated paper had no cracking after the embossing test. This overlay passed the embossing test. The water drop test showed that it took more than 15 minutes for the drop of water to be absorbed, demonstrating acceptable water resistance. This overlay also passed the water drop test.

Example 6

An acrylic resin C was used to treat kraft paper. The acrylic resin C has a Tg of 23° C. The paper was treated to a resin content of 25.4 wt. % and volatile content of 0.6 wt. %. The impregnated paper was tested using the embossing test and water drop test as described herein. The impregnated paper had no cracking after the embossing test. This overlay passed the embossing test. The water drop test showed that it took more than 15 minutes for the drop of water to be absorbed, demonstrating acceptable water resistance. This overlay also passed the water drop test.

In summary, these examples demonstrated that the acrylic resins having Tg in the range of –20 to 40° C. are capable of impregnating kraft paper to a resin content in the range of 15 to 35 wt. % and such impregnated kraft paper has acceptable flexibility to allow embossment and folding around corners. Further, the impregnated kraft paper has acceptable level water resistance to be used as building materials that will be exposed to humidity.

The resins other than acrylic resin (such as PVA resins used in the Comparative Examples A-B) do not provide the flexibility and water resistant, even though these PVA resins have Tg in the range of –20 to 40° C. and impregnated into kraft paper to a resin content in the range of 15 to 35 wt. %. The impregnated paper with PVA is either too rigid to be embossed or bent and/or lack of acceptable water resistance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

The applicant(s) do not intend to dedicate any disclosed embodiments to the public, and to the extent any disclosed modifications or alterations may not literally fall within the scope of the claims, they are considered to be part hereof under the doctrine of equivalents.

What is claimed is:

1. An overlay comprising paper impregnated with a resin composition, wherein said resin composition comprises:
    a thermoplastic acrylic resin having a glass transition temperature in a range of from about –20 ° C. to about 40 ° C.,
    wherein the acrylic resin content in the overlay is in a range of from about 15 wt. % to about 35 wt. % based on the weight of the overlay,
    wherein the overlay is affixed to a substrate selected from the group consisting of a gypsum board, a wall board, and a panel, and
    wherein the overlay is free of formaldehyde.

2. The overlay of claim 1, wherein the glass transition temperature is in a range of from about 10° C. to about 35° C.

3. The overlay of claim 1, wherein the overlay further comprises 0.0001 wt. % to about 3.5 wt. % a wax, based on a solid wax weight, and the wax has a melt point in a range of from about 15° C to about 85° C.

4. The overlay of claim 1, wherein the overlay further comprises 0.0001 wt. % to about 3.5 wt. % a wax, based on a solid wax weight, and the wax is selected from slack wax, paraffin wax, Montan wax, microcrystalline wax, and mixture thereof.

5. The overlay of claim 1, wherein the acrylic resin content in the overlay is in a range of from about 15.0 wt. % to about 32.5 wt. %, based on the weight of the overlay.

6. The overlay of claim 1, wherein the resin composition further comprises a component selected from diols, release agents, antifoaming agents and wetting agents.

7. The overlay of claim 1, wherein the paper is kraft paper.

8. The overlay of claim 7, wherein the kraft paper has a basis weight in a range of from about 70 to about 90 $g/m^2$.

9. The overlay of claim 7, wherein the kraft paper has an ash content in a range of from about 5 to about 12 wt. % of the kraft paper.

10. The overlay of claim 1, wherein the overlay further comprising an acrylic paint coating that comprises an acrylic resin.

11. The overlay of claim 10, wherein the acrylic paint coating has a weight in a range of from about 25 to about 45 $g/m^2$.

12. The overlay of claim 1, wherein the overlay has a volatile content in a range of up to about 4%, based on the weight of the overlay.

13. The overlay of claim 1, wherein the overlay has a water ingress less than 200 $g/m^2$ as measured using ASTM D-5795 and more than 500 cycles as measured using a Taber abraser in conjunction with a Calibrase CS-17 wheel.

14. A building product comprising an the overlay,
wherein the overlay comprising paper impregnated with a resin composition, wherein said resin composition comprises:
a thermoplastic acrylic resin having a glass transition temperature in a range of from about -20 ° C.to about 40 ° C.,
wherein the acrylic resin content in the overlay is in a range of from about 15 wt. % to about 35 wt. % based on the weight of the overlay,
wherein the overlay is affixed to a substrate selected from the group consisting of a gypsum board, a wall board, and a panel, and
wherein the overlay is free of formaldehyde.

15. The building product according to claim 14, wherein the building product is a ceiling tile comprising gypsum board.

16. The building product according to claim 14, wherein the building product has a Sound Transmission Class (STC) rating of about 30 to about 65 when tested in accordance with ASTM E90-04 and E413-04.

* * * * *